Aug. 27, 1963

S. E. GAIL 3,101,824

FORCE SENSING DEVICE

Filed May 12, 1960

INVENTOR.
STEWART E. GAIL

BY
Bosworth, Sessions
Herrstrom & Knowles
ATTORNEYS.

Aug. 27, 1963

S. E. GAIL 3,101,824

FORCE SENSING DEVICE

Filed May 12, 1960

INVENTOR.
STEWART E. GAIL

BY
Bosworth, Sessions,
Herrstrom & Knowles
ATTORNEYS

Aug. 27, 1963 S. E. GAIL 3,101,824
FORCE SENSING DEVICE
Filed May 12, 1960 3 Sheets-Sheet 3

INVENTOR.
STEWART E. GAIL
BY Bosworth, Sessions
Herrstrom & Knowles
ATTORNEYS.

United States Patent Office 3,101,824
Patented Aug. 27, 1963

3,101,824
FORCE SENSING DEVICE
Stewart E. Gail, Northfield, Ohio, assignor to
Lear Siegler, Inc.
Filed May 12, 1960, Ser. No. 28,660
11 Claims. (Cl. 192—8)

This invention relates to mechanical force sensing devices, and more particularly to such a device which, if a driving member develops a force, such as a torque, exceeding a predetermined magnitude or value, moves a member which may control a circuit, mechanism or machine. While the invention may be used advantageously in various applications, it will be discussed and described in connection with the control of braking means associated with electric motors in apparatus for actuating airfoils such as wingflaps in aircraft, since the invention provides particular advantages in such use.

When an aircraft airfoil is designed to be actuated by a power source such as an electric motor, it is imperative that the airfoil be under control at all times. Thus when the airfoil is being moved by an electric motor, it must be under control of the motor; when it is not being moved by the motor it must be restrained against movement. It has been the practice to employ a brake which prevents rotation of a motor driven airfoil actuating shaft when the motor is not operating, and which releases the shaft when the motor is operating. It is important, however, that the brake be released only after the motor is operative and has developed enough torque to move the airfoil; conversely, it is equally important that as soon as the motor stops, the brake be set immediately to prevent rotation of the airfoil actuating shaft and uncontrolled movement of the airfoil. If control over the airfoil should be lost for even a short time, the aircraft might be endangered.

It is therefore desirable to employ, in combination with the motor and brake, a sensing device that will sense or determine when the motor has developed torque greater than a predetermined value sufficient to move the airfoil under all conditions likely to be encountered in service, and then rapidly release the brake. Since motors used in airfoil actuating apparatus may rotate in service at speeds of several thousand r.p.m., it is important that the device be of light, balanced, and sturdy construction. A torque sensing device for such service should operate rapidly and infallibly over a wide range of service conditions, require little maintenance, have long life and durability, and maintain substantially the same torque sensing characteristics throughout its service life.

Sensing devices heretofore available do not possess all of these desirable characteristics. In general, prior mechanical devices for this purpose have comprised mating, sliding, spring-loaded cam surfaces and cooperating mechanism to convert rotational motion of the motor drive shaft to axial motion for operating a brake control switch. In devices of this type, the magnitude of the torque which activates the device depends on both the spring load on the cam surfaces and the friction between such surfaces. Changes in the frictional characteristics cause changes in the torque value to which the sensing device responds. The frictional characteristics can change abruptly due to dust, or more gradually due to wear or corrosion. In any event, frictional changes impair the precision of operation of the torque sensing device, and hence the precision and effectiveness of airfoil control.

A general object of this invention is to provide a force sensing device which satisfies the desired factors mentioned above and which avoids the above-described deficiencies of prior devices. Another object is to provide a mechanical force sensing device which operates on the principle of substantially linear or rolling contact between one or more force sensing elements and other cooperating members. A further object is the provision of a force sensing device in which there is no appreciable movement of the parts thereof before development of force of a predetermined value, but in which the parts trip and move rapidly after such force has been developed. Another object is the provision of such a device in which the movement, once initiated, is not affected by later increases in force magnitude. Another object is the provision of such a device which will automatically quickly return to its original at rest position when the force to which it is subjected is less than a predetermined amount. Another object is the provision of an actuating apparatus comprising a power source, a driven shaft adapted to be rotated by the power source, a brake adapted to control the rotation of such driven shaft, and a torque sensing device which controls the brake so that it prevents rotation of the driven shaft until the power source has developed torque exceeding a predetermined value but permits rotation of the driven shaft after the development of such torque. Another object of the invention is to provide force sensing devices embodying the above characteristics and which are simple and sturdy in construction and operation and which may be manufactured at a reasonable cost.

Further objects and advantages of this invention will become apparent from the following description of a preferred form thereof, reference being made to the accompanying drawings in which.

Figure 2:
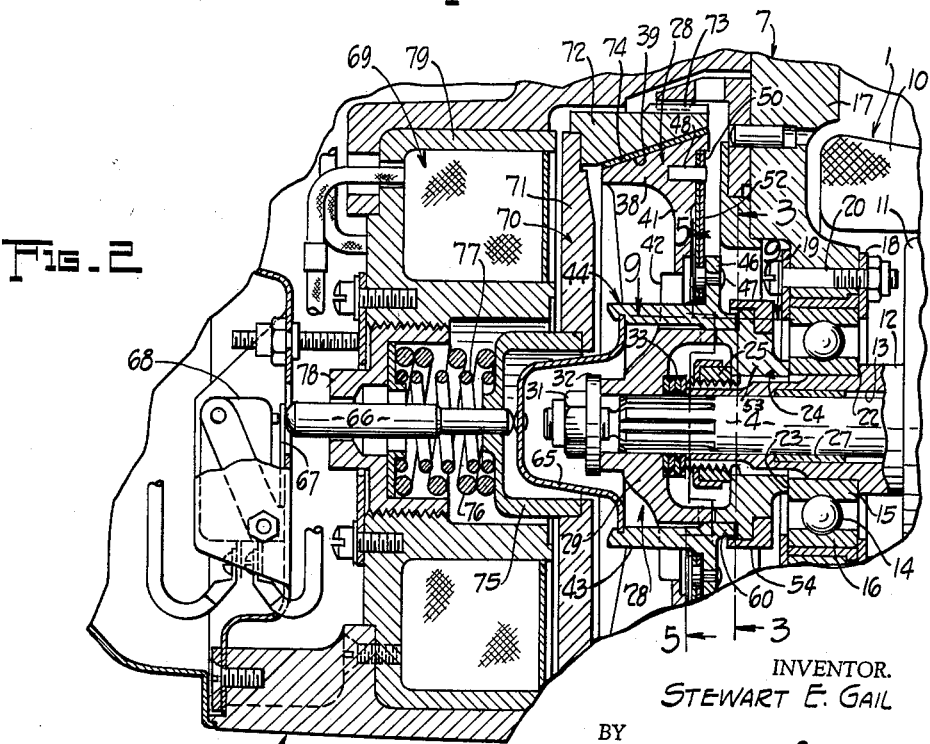
FIGURE 2 is a side elevation to an enlarged scale of a portion of the apparatus of FIGURE 1, showing the parts in the positions they occupy when the brake is engaged to prevent rotation of the driven shaft.
Figure 8:
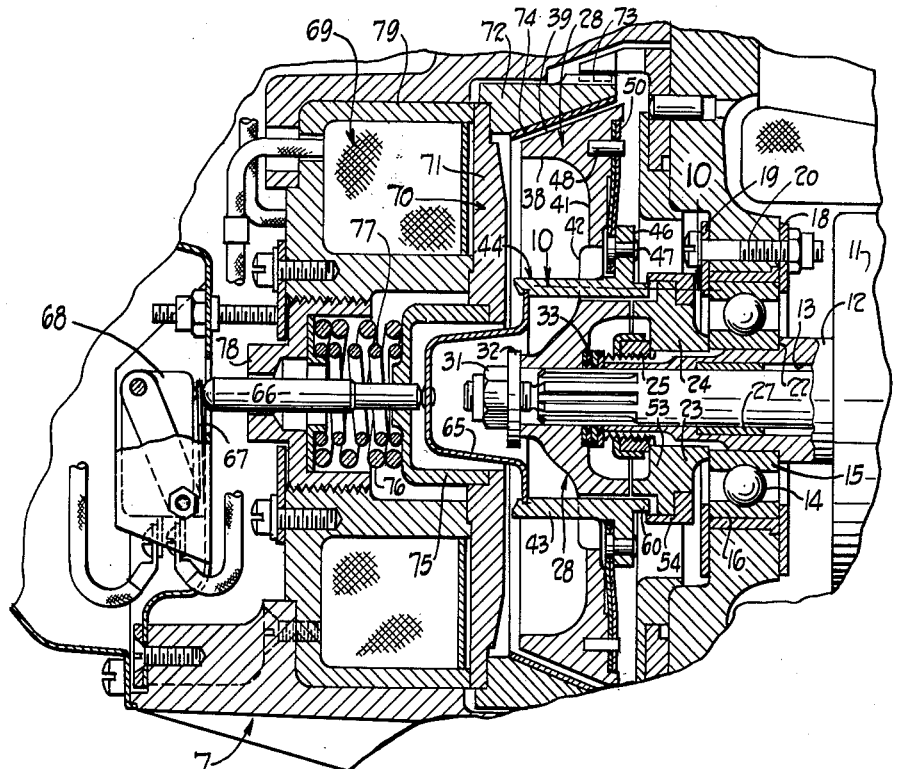
FIGURE 8 is a side elevation of a portion of the apparatus of FIGURE 1, to the same scale as FIGURE 2, with parts broken away, showing the position of the parts of the apparatus after the torque sensing elements have moved in response to the development by the motor of a torque exceeding a predetermined value and have caused disengagement of the brake to permit rotation of the driven shaft.
Figure 9:
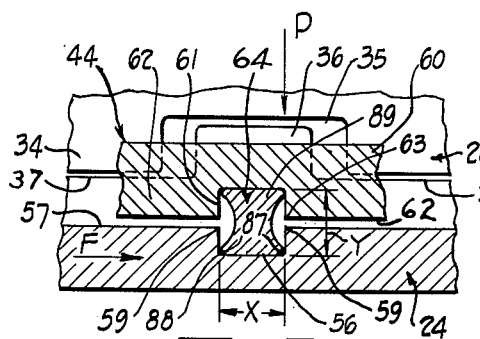
Figure 10:
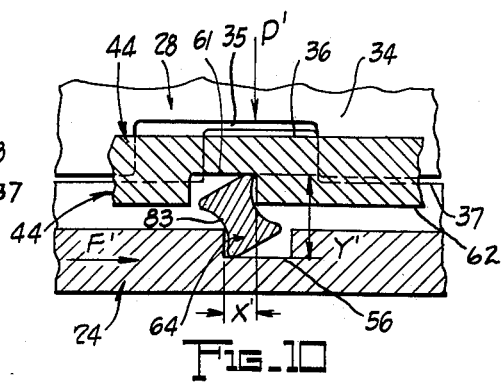

FIGURE 9 is a sectional elevation along line 9—9 of FIGURE 2 and to a scale larger than that of FIGURE 2, showing one of the torque sensing elements and associated parts of the device in their relative positions when there is no torque; and FIGURE 10 is a sectional elevation, corresponding generally to FIGURE 9, but taken along line 10—10 of FIGURE 8, showing the relative positions of a torque sensing element and its associated parts after the motor has developed torque exceeding the value which causes the torque sensing element to move to its actuating position.

Figure 1:
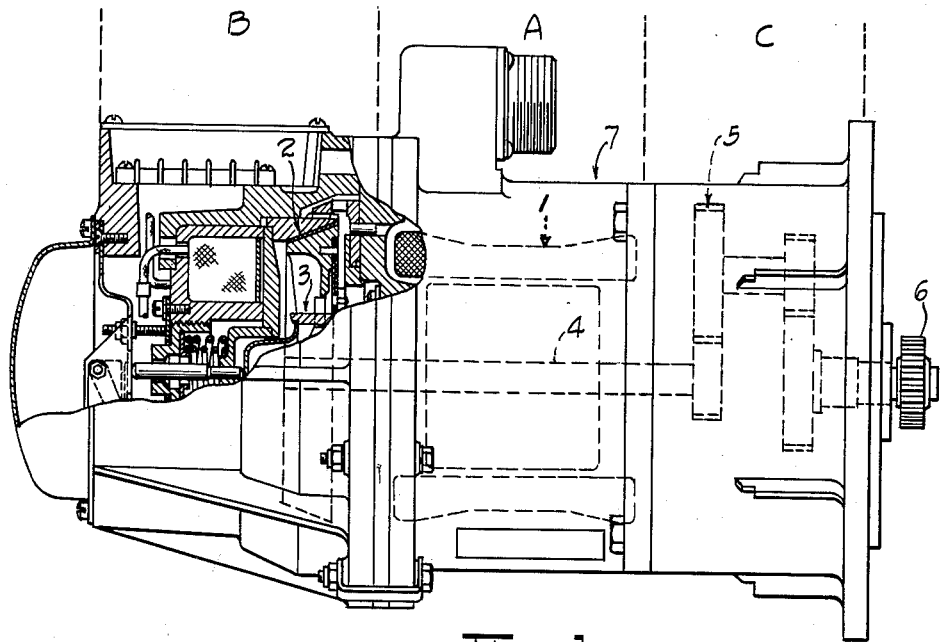
FIGURE 1 is a side elevation, with parts broken away, of an apparatus for actuating an airfoil of an aircraft, comprising an electric motor, a brake to control the rotation of a shaft driven by the motor, and a torque sensing device which controls the operation of the brake.

In the drawings the invention is illustrated as embodied in an electrical apparatus for actuating an aircraft airfoil, such as a wingflap. Referring to FIGURE 1, the apparatus comprises a central section A, containing an electric motor, generally indicated by reference numeral 1, constituting the power source and hence the source of force or torque; an end section B containing a brake generally designated as 2, and a torque sensing means generally referred to as 3, which controls means for applying the brake to prevent rotation of driven shaft 4 when the motor 1 is not operating or has not developed torque of a predetermined magnitude, and for releasing the brake to permit rotation of the shaft when the motor is operating and has developed torque of such predetermined magnitude; and an opposite end section C containing a speed-reducing geartrain generally indicated by numeral 5 for transmitting power from driven shaft 4 to a pinion 6 from which the airfoil is actuated. The apparatus as a whole is enclosed in a housing generally indicated at 7.

As shown in FIGURE 2, the motor in section A comprises a stator 10 rigidly mounted in any suitable manner in the housing 7, and a rotor 11 rigidly mounted by suitable means on a hollow drive shaft 12 having a concentric longitudinal bore 13 in which the driven shaft 4 is journalled as described below. The drive shaft 12 is rotatably mounted in housing 7 by a ball bearing 14 mounted with its inner race 15 on shaft 12 and its outer race 16 in partition 17 adjacent section B of the housing, and by another bearing, not shown, mounted near section C of the housing. Shaft 12 is also restrained against axial movement in the housing 7 by bearing 14. For this purpose, the outer race 16 of bearing is firmly held by clamping rings 18 and 19 fixed to partition 17 by bolts 20, while inner race 15 is press-fitted on the exterior surface of drive shaft 12 and clamped between shoulder 22 on the drive shaft and boss 23 of driving member 24. Member 24 is splined to the drive shaft 12 and held in place by locking nuts 25 threaded on the end of the shaft.

The driven shaft 4 is journalled in the bore 13 of hollow driving shaft 12 by suitable means including a sleeve bearing 27. Shaft 4 is rotatable relatively to drive shaft 12 only within limits established by other parts of the mechanism to be later described, for this reason the bearing 27 can be a plain bearing; shaft 4, however, is constrained against movement longitudinally of shaft 12 by suitable means, including the parts described below.

When permitted by brake 2 controlled by torque sensing device 3, the driving member 24 mounted on shaft 12 positively rotates the driven member 28 fixed to the end of driven shaft 4 projecting from drive shaft 12. Members 24 and 28 are concentrically mounted so that they are capable of limited rotational movement relative to each other but are substantially incapable of axial movement relative to each other or to housing 7. Member 28, which is preferably formed of steel that has been surface-hardened at parts subject to wear, comprises an integral hub portion 29 splined to the end of driven shaft 4 and located against axial movement relative to shaft 4 and housing 7 by a nut 31 threaded on the end of the shaft and a washer 32 bearing against the outer side of hub portion 29, and by a thrust member 33 located between the inner side of the hub portion and the end of drive shaft 12.

Figure 5:
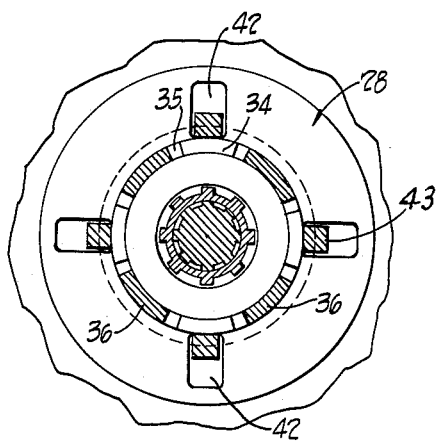
FIGURE 5 is a section along line 5—5 of FIGURE 2, showing the clutch teeth on driving and driven members, by which the driven shaft is rotated after the brake is disengaged.

Hub portion 29 of driven memer 28 is also formed with a plurality of axially projecting clutch teeth 34, four in the illustrated embodiment. As shown in FIGURES 5, 9, 10, clutch teeth 34 are separated by recesses 35 adapted to receive mating, axially projecting clutch teeth 36 on driving member 24; clutch teeth 36 are separated by similar recesses 37 adapted to receive clutch teeth 34 of driven member 28. Recesses 35 and 37 are wider by a predetermined amount than the clutch teeth 36 and 34 adapted to be received in them, for reasons set forth below. Driven member 28 also includes an outer rim portion 38 having an external frusto-conical surface 39 sloping inwardly away from motor section A and constituting the rotating member of the brake 2. Between its rim portion 38 and hub portion 29 the member 28 includes a generally radially extending intermediate portion 41 having a plurality of openings 42 extending through it. These openings are located and adapted to provide clearance for axially extending fingers 43 which project through the openings and form parts of torque actuated member 44.

Member 44, as described later, is adapted to move axially with respect to driving and driven members 24 and 28 when the motor torque exceeds a predetermined amount; such movement causes the brake 2 to release the drive shaft 12 for rotation. Member 44 cannot move rotationally relatively to driven member 28, but is capable of limited rotational movement relatively to driving member 24. Member 44 comprises a radially extending flange 46 to which are fixed a plurality of circumferentially spaced studs 47 projecting axially toward the driven member 28. Driven member 28 rigidly supports a plurality of circumferentially spaced pins 48 which project toward torque actuated member 44 from its flat rear surface which terminates at an inwardly facing shoulder 50 on the rim portion 38 of member 28. A dished disk spring member 52 is mounted with its outer circular edge located by and bearing against such rear surface and shoulder 50 of member 28, and with its inner edge, defined by a central opening, pressing against the rear surface of flange 46 of member 44. Spring 52 also contains openings located and sized to fit closely the studs 47 of member 44 and pins 48 of member 28, so that there is substantially no relative rotational movement possible between driven member 28, torque actuated member 44 and spring 52. However, the torque actuated member 44 is capable of limited axial movement and is resiliently urged toward the driving member 24 under a predetermined pressure or force applied by spring 52.

Figure 3:
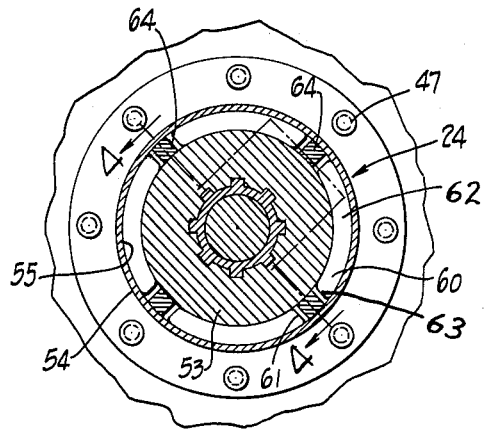
FIGURE 3 is a section along line 3—3 of FIGURE 2, showing the torque sensing elements in the apparatus of FIGURE 2.
Figure 4:
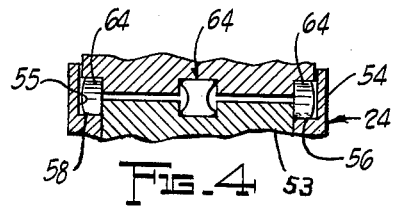
FIGURE 4 is a section along line 4—4 of FIGURE 3.

Driving member 24, as shown in FIGURES 3 and 4 is circular in cross section and includes a hub member 53 carrying boss 23 and rim member 54, which are shaped and fixed together as by brazing to define a circumferential annular groove 55 extending axially with its open end toward the torque actuated member 44. The bottom of the groove has four pockets or depressions 56 offset inwardly from and separated by flat sections 57 of the groove bottom. As shown to advantage in FIGURES 9 and 10, each pocket 56 of the illustrated device comprises a flat bottom 58 and two generally radially and axially extending end walls which intersect adjacent flat sections 57 of the groove bottom to form generally radially extending outer edges 59. Member 24 is preferably formed of steel which has been surface-hardened to provide good wearing qualities on the surfaces of the pockets and the clutch teeth 36.

Torque actuated member 44 which is also preferably formed of surface-hardened steel, has an annular flange 60 adapted to fit closely but movably in groove 55 of driving member 24. The flange is provided with recesses 61 which are equal in number and length to the pockets 56 of member 24 and preferably equal in depths, and are separated by outwardly offset flat surfaces 62. Generally radially extending outer edges 63 are defined by the intersections of generally radially and axially extending end walls of recesses 61 and adjacent flat surfaces 62.

In the assembled apparatus, the driving member 24, driven member 28 and torque actuated member 44 are concentric so that the flange 60 of torque actuated member 44 is disposed in groove 55 of driving member 24 with recesses 61 of member 44 overlapping the pockets 56 of member 24 to form pairs, and with flat surfaces 62 of member 44 overlapping the flat surfaces 57 in groove 55 of member 24. Also, fingers 43 of member 44 project through the openings 42 in driven member 28; and clutch teeth 36 of driving member 24 are disposed in recesses 35 of driven member 28 while clutch teeth 34 of driven member 28 are disposed in the similar recesses 37 of driving member 24. Furthermore, as described above, spring 52 prevents the torque actuated member 44 from rotating relatively to driving member 28, but resiliently urges such member 44 axially toward driving member 24 with a predetermined force determined by the spring characteristics. Torque actuated member 44 thus is mounted concentrically relative to driving member 24 and driven member 28, is capable of limited axial and rotational movement relative to member 24, and is capable of limited axial but no rotational movement relative to member 28.

As shown in FIGURES 3, 4, 9 and 10, a plurality of torque sensing elements 64 are mounted in the pockets 56 and recesses 61 of driving member 24 and torque actuated member 44. These elements 64 are adapted to tilt and move the torque actuated member 44 axially against the force provided by spring 52 when torque exceeding a predetermined amount is exerted on them by driving member 24 mounted on the drive shaft 12 of the motor. All of the torque sensing elements are identical; one of these elements 64 is located in each space formed by a pocket 56 in groove 55 of driving member 24 and by its paired or mating recess 61 in flange 60 of torque actuated member 44. While in the illustrated embodiment there are four such spaces each containing a torque sensing element 64, this number being preferable, different numbers of spaces and elements may be used. The axial movement of torque actuated member 44 resulting from development of the predetermined motor torque is transmitted by a member 65, which is fixed to the ends of fingers 43 of member 44, to a plunger 66, which presses against and depresses spring member 67 of a microswitch 68 supported from housing 7. This closes the switch, permitting current from a suitable source of supply to energize a suitable electromagnet 69, rigidly carried by housing 7. When the electromagnet is thus energized, the armature 70 is drawn toward it.

Armature 70 comprises a radially extending portion 71 disposed in close proximity to the poles of the electromagnet and formed of a ferro-magnetic material; this radial portion carries an outer rim 72 by which the armature as a whole is nonrotatably but slidably carried by housing 7 through splines 73. Rim 72 has an internal frusto-conical brake surface 74 comprising a layer of suitable friction material which is adapted to engage and fit the external frusto-conical brake surface 39 of driven member 28; armature 70 thus constitutes the non-rotatable member of brake 2. Armature 70 also includes a central member 75 which is recessed to clear the end of driven shaft 4 and member 65 and slidably supports plunger 66; this central member 75 also receives the thrust of springs 76 and 77 located between member 75 and the cap 78 threaded into the frame 79 of the electromagnet 69 fixed in housing 7.

Figure 6:
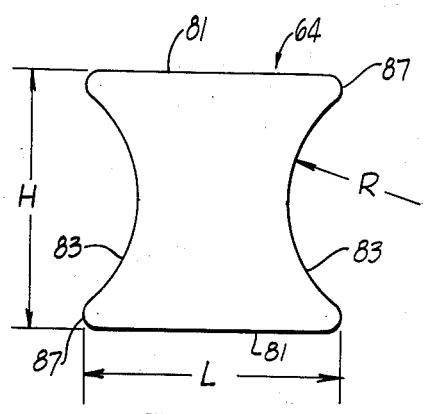
FIGURE 6 is a front elevation to an enlarged scale of one of the torque sensing elements.
Figure 7:
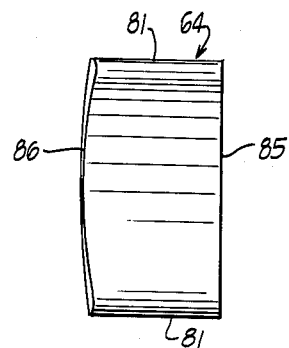
FIGURE 7 is a side elevation to the same scale of the element of FIGURE 6.

The illustrated torque sensing elements 64 are formed of surface-hardened steel and, as shown in enlarged scale in FIGURES 6 and 7, have two identical parallel flat ends 81, two identical inwardly recessed sides 83 defined by concave curves of radius R, a flat rear 85, and a spherically curved front 86 the radius of which is slightly smaller than that of the outer surface of groove 55 in which the element is disposed. The edges 87 at the intersections of the flat ends 81 and curved sides 83, theoretically could be lines, but in practice are formed with small radii for better wearing results. The length L of each end 81 of element 64 is slightly less than the length of the pocket 56 of driving member 24 and the identical length of recess 61 of torque actuated member 44 so that the ends 81 closely but movably fit in pockets 56 and recesses 61. The height X of each element 64 is slightly greater than the combined depths of the pocket 56 and recess 61 so that a clearance is provided between the flat sections 57 of groove 55 of member 24 and the flat surfaces 62 of member 44. In the illustrated embodiment, the length L and height H are substantially equal, although this is not required. The radii of the curved walls of groove 55, the lengths of pockets 56 in driving member 24 and corresponding recesses 61 in torque sensing member 44, and the pressure or force applied by spring 52 axially of torque actuated member 44 are all related and together determine the torque value which must be exceeded by the torque developed by motor 1 acting on driving member 24 through shaft 12 to cause the torque sensing elements 64 to tilt to an angular position. Tilting of the elements 64 results in axial movement of member 44 and closing of microswitch 68. The angle to which these elements can tilt depends upon the amount of relative rotation permitted between members 44 and 24 by clutch teeth 34 and 36 in their recesses, by the depths of pockets and recesses 56 and 81, and by the depth and shape of the recesses sides 83.

The normal or at rest positions of the parts of the assembly are shown in FIGURE 1, while FIGURE 9 shows the corresponding positions of one of the torque sensing elements 64 and portions of driving member 24, driven member 28, and torque actuated member 44. This is the condition when the motor 1 is stationary or has not developed torque exceeding the predetermined value which will trip the device. The positions of the parts of the assembly in general, and the tilted positions of a torque sensing element 64 and its associated members after the motor has been energized and the driven member 24 has developed torque exceeding the predetermined value are shown in FIGURES 8 and 10, respectively.

As shown in FIGURE 9, since the torque sensing elements are symmetrical in the dimensions shown in FIGURE 6, the pockets 56 and recess 61 of each pair are directly opposite each other (i.e., fully overlap) when the parts are at rest. When the motor initially develops torque a corner 88 of each pocket 56 of driving member 24 forms a fixed bearing or fulcrum on which the adjacent edge 87 of the torque sensing element 64 can pivot; the diagonally opposite edge 87 of the element 64 pivotally bears against the diagonally opposite corner 89 of the recess 61 in the torque actuated member 44, which corner thus forms fixed bearing or fulcrum on member 44. These fixed bearings or fulcrums are thus offset by a distance or moment arm X that is predetermined by the length of the element 64 in the direction of rotation, which is the direction of application of the force F resulting from the motor torque; they are also separated by a distance or moment arm Y predetermined by the height of the element 64 and extending axially of the parts and perpendicularly to such direction of applied force. The spring 52 exerts a force P perpendicular to the force F resulting from the torque. Since member 44 is non-rotatably fastened to driven member 28 which is held against rotation by the brake 2, member 44 cannot initially rotate with member 24 when torque is first applied by the motor.

It will be noted that the force F exerted by member 24 as a result of the motor torque is resisted by an equal and opposite force applied at the corner 89 of member 44; these two forces are separated by distance Y and constitute a couple which tends to rotate the torque sensing element 64 in a counter-clockwise direction in the example shown with a moment FY. This rotation is resisted by the force P applied by the spring 52, which is opposed by an equal and opposite force applied at corner 88 of member 24. These forces constitute a couple acting in opposition to the moment FY with a moment PX. Thus, so long as the moment FY remains less than the moment PX, the parts remain in the position shown in FIGURE 9. However, as soon as the torque applied by the motor to member 24 becomes great enough so that moment FY exceeds moment PX, then each element 64 tilts and the driven member 24 rotates a short distance relative to the torque sensing member 44 to the position shown in FIGURE 10 in which the pocket 56 and recess 61 of each pair partially overlap. The amount of relative rotation is determined by the distance the clutch teeth 36 of driving member 24 travel in the recesses 35 of driven member 28 before contacting clutch teeth 34 of driven member 28; this distance is sufficient to cause each torque sensing element 64 to tilt to a substantial angle relative to its normal position, the angle being determined by the factors mentioned above. The angle is not so great as to permit the torque sensing element to overturn or contact its concave sides 83 against the edges 59 or 63 of members 29 or 44, the radius R of the recesses sides of the illustrated torque sensing element being designed to prevent such contact.

In rotating to their tilted positions, the torque sensing elements 64 move the member 44 axially of the driven shaft 4 away from driving member 24 by an amount determined by the diagonal dimension of the side of each torque sensing element 64 and the angle assumed by each such element. Thus, the above-mentioned bearings or fulcrums provided by the corners 88 and 89 on members 24 and 44 move so that the distance X between them decreases to a distance X' while the separating distance Y increases to a distance Y'.

As stated above, this axial movement of torque actuated member 44 moves plunger 66 axially to press against member 67 to actuate the microswitch 68, thus energizing the electromagnet 69, disengaging the brake surfaces 39 and 74 and permitting rotation of driven member 28 and the driven shaft 4 on which it is mounted. Driven shaft 4 thus transmits power from the motor 1 through geartrain 5 to pinion 6, to actuate the airfoil.

In an airfoil actuating system, the forces acting on the airfoil during operation may be such that the torque reverses on the pinion 6, and hence on the driven shaft 4 and drive shaft 12. In other words, the torque requirements on the drive shaft 12 go from a positive value, when the motor is exerting torque, through zero, to a negative value when torque is being exerted on the shaft 12 by the airfoil. Reversals of this type can occur at high frequencies. Since the torque sensing elements 64 return to their untilted positions when the torque value falls below a predetermined amount, the illustrated apparatus is preferably employed in conjunction with an electrical circuit, not shown, embodying a suitable holding circuit whihch maintains energization of the brake release electromagnet 69 so long as power is applied to the motor; the circuit preferably deenergizes the electromagnet only when the motor is deenergized as by cut-off of electrical energy to its stator windings. When such a circuit is employed, therefore, once the motor has demonstrated that it is operative to develop torque of a predetermined value, the brake 2 will remain disengaged until the motor is stopped.

The illustrated torque sensing device 3 possesses operative features other than that of initially sensing torque which are advantageous in uses other than airfoil actuating. Thus, the device automatically resets itself, or returns to its position of rest, once the torque exerted between the driving and driven members falls below a predetermined value. This torque value is less than the torque value required initially to trip the device. The reason for this is that, as shown in FIGURES 9 and 10, when each torque sensing element 64 is in its tilted position after tripping of the device, the moment arm X' is considerably less than the similar moment arm X when the element 64 is in its untilted position while the moment arm Y' is considerably greater than the corresponding moment arm Y when the element 64 is untilted. To trip the device, the moment FY must be greater than the moment PX; to maintain it tripped the moment F'Y' must exceed moment PX'. Since the force P supplied by spring 52 is as a practical matter constant, it is obvious that the force F' can be considerably less than force F. Consequently, once the device has been tripped by the application of a predetermined initial trip torque value, it will remain tripped even when subjected to torque values substantially lower than the trip value. It will, however, return to its rest position when subjected to a torque less than a return torque value which is determined by the relative values of P, X' and Y', where the latter two dimensions are established by the geometry of the parts of the device. The fact that the torque sensing device will remain tripped through a range of lesser torques than the initial tripping force or torque is advantageous for many uses, since it renders less critical the transmission of torque, once started, and since this characteristic is compatible with the requirements on the power source of high initial torque and lower operating torque.

It is also apparent that the torque sensing device illustrated as embodying the invention has the advantage of operating in either direction of rotation, in distinction to most, if not all, prior devices which will operate only in the one direction of rotation for which they are designed. Furthermore, the illustrated device operates equally well in either direction of rotation under the same torque values for tripping and returning, because of the symmetry of the torque sensing elements 64 and associated parts. It is to be noted that by making the parts unsymmetrical, as by offsetting the top and bottom surfaces of elements 64, devices embodying the invention could be made which are repsonsive to different torque valves in one direction of rotation than the other even though they will otherwise operate in either direction of rotation.

As is apparent from the above, in operation of the illustrated device prior to tripping, there is substantially no rotational motion of drive shaft 12, of driving member 24 fixed to such shaft, or of motor 1, and no appreciable relative motion of any other parts of the device until the predetermined initial tripping torque magnitude has been exceeded. Once this torque value is exceeded, the device trips substantially instantaneously by the tilting of the torque sensing elements 64 and the resulting movement of torque actuated member 44 axially away from the driving member 24.

The parts remain in tripped position so long as the torque is above a lower limit, as described above. When the torque falls below this lower limit, the device returns to its at rest position substantially instantaneously by return of the torque sensing elements 64 to their untilted normal positions and by axial movement of member 44 toward driving member 24. The magnitude of the torque below the lower critical value is immaterial and does not retard or otherwise affect the operation of the device.

Rolling bearing contact, approaching substantially linear bearing contact, is provided by the sharply curved edges 87 of each torque sensing element 64 in their contacts with the diagonally opposed corners of a pocket 56 and its paired recess 61 in which the element 64 is disposed. For this reason and since there is no appreciable motion of these elements until the developed torque exceeds the predetermined value required to trip the device, the torque sensing ability of the device is not affected by changes in the frictional characteristics of relatively moving surfaces of torque sensing parts, as occurs in prior devices. Hence, devices embodying the present invention are not affected appreciably, if at all, by wear, corrosion, dust or other factors which in prior devices change the frictional characteristics of surfaces of torque sensing parts. Moreover, the torque sensing characteristics remain substantially uniform throughout the life of devices of the present invention and they require little or no compensatory adjustments and little maintenance.

Since devices of the invention can be of simple design and made of a relatively few sturdy parts, they can readily be made of balanced constructions to be vibration free and withstand the centrifugal forces developed by high speeds of rotation of parts of airfoil actuating systems, and to endure trip and return cycles at high frequencies for long periods.

These characteristics render devices embodying the invention particularly useful in aircraft applications, where their reliability, durability, freedom from maintenance problems, and long service life are of exceptional importance. However, force sensing devices embodying the invention may be employed to advantage in other applications; thus, devices embodying the invention may be constructed to sense linear forces rather than torques.

Therefore it will be appreciated that the invention may be adapted to devices of different types than that specifically disclosed therein which is given by way of example only. The essential characteristics of the invention are set forth in the appended claims.

I claim:

1. In a torque responsive coupling device, a rotatably mounted driving member adapted to develop a torque and having a plurality of circumferentially spaced axially extending recesses therein, a rotatably coaxially mounted torque actuated member having a plurality of circumferentially spaced axially extending recesses therein, said recesses in both said members having open ends and flat bottoms disposed in planes normal to the axis of rotation and having identical lengths terminating in generally radially extending edges and being so located that they form related pairs in which the open ends of said recesses face and overlap each other, means rotatably supporting said driving and torque actuated members and permitting therebetween limited relative axial movement and limited relative rotational movement from a position of maximum overlap of said recesses to a position of minimum overlap of said recesses, means yieldable exerting a predetermined force urging said driving and torque actuated members axially toward each other, and a torque sensing element disposed in each pair of recesses, said element being of a height greater than the total of the depths of said paired recesses and having flat end surfaces adapted to bear against and closely fit the flat bottoms of said paired recesses and sides adapted to clear said generally radially extending edges of said recesses when said element is in a tilted position in said recesses, whereby a torque limit magnitude is established such that when said driving and torque actuated members are disposed with their paired recesses in the position of maximum overlap and the torque sensing elements are disposed therein with their flat ends bearing against the flat bottoms of said recesses, a torque exceeding such predetermined magnitude exerted by said driving member will cause said torque sensing elements to tilt in said recesses, said driving and torque actuated members to rotate relatively to each other to the position of minimum overlap of the recesses of each pair, and said torque actuated member and driving member to move axially relatively away from each other by forces exerted by said tilted torque sensing elements on said members, said forces exceeding the force exerted by said resilient pressure means.

2. In a torque responsive coupling device, a rotatably mounted driving member adapted to develop a torque and having an annular axially extending groove with a generally radially extending bottom in which are formed a plurality of circumferentially spaced axially extending recesses, a torque actuated member coaxially mounted for limited rotational and axial movement relative to said driving member and having an annular axially extending flange adapted to fit in said groove of said driving member, and having a generally radially extending outer edge in which are formed a plurality of circumferentially spaced axially extending recesses, said recesses in both said members having open ends and flat bottoms disposed in planes normal to the axis of rotation and having substantially identical depths and substantially identical lengths terminating in generally radially extending outer edges and being so located that they form related pairs in which the open ends of said recesses face each other, said members being adapted to rotate relatively to each other for a limited distance from a position in which said recesses are directly opposite to one in which their lengths are partially offset, resilient pressure means exerting a force urging said torque actuated member axially toward said driving member, and a torque sensing element disposed in each pair of said recesses, said element being of a height greater than the total of the depths of said recesses in said pair and having flat end surfaces adapted to bear against and closely fit the bottoms of said recesses and having inwardly recessed sides adapted to clear the outer edges of said recesses when said element is in a tilted position, said dimensions of said torque sensing element and said recesses and the force exerted by said resilient pressure means being such that they predetermine a torque magnitude, whereby when said driving and torque actuated members are disposed with their paired recesses directly opposite each other and the torque sensing elements are disposed therein with their flat ends bearing against the flat bottoms of said recesses, a torque exceeding such predetermined magnitude exerted by said driving member will cause said torque sensing elements to tilt in said recesses, said driving and torque actuated members to rotate relatively to each other to the position in which the recesses of each pair are offset, and said torque actuated member to move axially relatively away from said driving member by forces exerted by said tilted torque sensing elements on said torque actuated member, exceeding the force exerted by said resilient pressure means.

3. Actuating apparatus comprising an electric motor having a rotatably mounted hollow drive shaft, a driving member rigidly mounted on said drive shaft and having an axially extending annular groove with its open end extending away from said motor, said groove having a generally radially extending bottom in which are formed a plurality of circumferentially spaced axially extending recesses, a driven shaft journaled in said drive shaft, a driven member rigidly mounted on said driven shaft, a torque actuated member coaxially supported from said driven member for limited rotational and axial movement relative to said driving member by means including spring means exerting a force urging said torque actuated member toward said driving member, said torque actuated member having an annular axially extending flange projecting into the groove of said driving member, said flange having a generally radially extending outer edge in which are formed a plurality of circumferentially spaced axially extending recesses, said recesses in said driving and torque actuated members having open ends and flat bottoms disposed in planes normal to the axis of rotation and having substantially identical depths and substantially identical lengths terminating in generally radially extending outer edges and being so located that they form related pairs in which the open ends of said recesses face each other, said recesses being directly opposite in one position of said driving and torque actuated members relative to each other and partially offset in another position, means on said driving member and driven member providing positive driving engagement between said members after limited relative rotational movement, a torque sensing element disposed in each pair of said recesses, said element being of a height greater than the total of the depths of said recesses of said pair and having flat end surfaces adapted to bear against and closely fit the bottoms of said recesses of said pair and having inwardly recessed sides adapted to clear the outer edges of said recesses when said element is in a tilted position in said recesses, said dimensions of said torque sensing element and said recesses and the force exerted by said spring means being such that they predetermine a torque magnitude, whereby when said driving and said torque actuated members are disposed with their paired recesses directly opposite each other and the torque sensing elements are disposed therein with their flat ends bearing against the flat bottoms of said recesses, a torque of such predetermined magnitude exerted by said driving member will cause said torque sensing elements to tilt in said recesses, said driving and said torque actuated members to rotate relatively to each other to the position in which the recesses of each pair are offset, and said torque actuated member to move axially relatively away from said driving member by forces exerted by said tilted torque sensing elements on said torque actuated member exceeding the force exerted by said spring means, brake means adapted to restrain from rotation said driven member and said torque actuated member carried thereby while permitting said relative movement between said driving member and torque actuated member, and means adapted to be actuated by such axial movement of said torque actuated member to release said brake means and permit rotation of said driving member, driven member, and torque actuated member.

4. A force responsive coupling device comprising a driving member adapted to move and to exert a force; a driven member adapted to be moved by the driving member when the driving member exerts a force exceeding a predetermined magnitude; releasable brake means preventing such movement of the driven member until released; and means responsive to a force exceeding a predetermined magnitude exerted by said driving member for releasing said brake means, comprising a first member connected to said driving member and adapted to exert in a first direction a force proportional to that exerted by said driving member, a second member adjacent to and spaced from said first member, means supporting said first and second members to permit limited relative movement therebetween in directions generally parallel to and transverse to said first direction, a third member disposed between said first and second members and having at fixed spaced locations thereon two separate bearing means which contact said first and second members, bearing means on said first member against which bears one of the bearing means of said third member at a location fixed relatively to said first member, bearing means on said second member against which bears the other bearing means of said third member at a location fixed relatively to said second member, said bearing means on said first and second members being offset by a predetermined distance in said first direction and being separated by a predetermined distance transversely to said first direction when said first member exerts a force below a predetermined magnitude in said first direction, means yieldably exerting a force urging said first and second members toward each other and against said third member in a direction transverse to said first direction, whereby when a force exceeding the predetermined magnitude is exerted in said first direction by said first member the force exerted by said third member against said bearing means on said first and second members exceeds the force exerted by said means urging said first and second members toward each other and said first and second members move relatively to each other to decrease the distance by which said bearing means on said first and second members are offset and to increase the distance by which said bearing means are separated, and means actuated by said relative movement of said first and second members for releasing said brake means and permitting said driving member to move said driven member.

5. The device of claim 4 in which said means exerting a predetermined force urging said first and second members toward each other exerts resilient force.

6. A force responsive coupling device comprising a driving member adapted to move and to exert a force; a driven member adapted to be moved by the driving member when the driving member exerts a force exceeding a predetermined magnitude; releasable brake means preventing such movement of the driven member until released; and means responsive to a force exceeding a predetermined magnitude exerted by said driving member for releasing said brake means, comprising a first member connected to said driving member and adapted to exert in a first direction a force proportional to that exerted by said driving member, a second member adjacent to and spaced from said first member, means supporting said first and second members to permit limited relative movement therebetween in directions generally parallel to and transverse to said first direction, a third member disposed between said first and second members and having at fixed spaced locations thereon two separate bearing means each capable of providing substantial linear bearing contact, bearing means at a fixed location on said first member providing substantially linear bearing contact with one of said bearing means on said third member, bearing means at a fixed location on said second member providing substantially linear bearing contact with the other of said bearing means, said bearing means on said first and second members being offset by a predetermined distance in said first direction and being separated by a predetermined distance transverse to said first direction when said first member exerts in said first direction a force below a predetermined magnitude, means yieldably exerting a force urging said first and second members toward each other against said third member in a direction transverse to said first direction, whereby when a force exceeding the predetermined magnitude is exerted in said first direction by said first member the force exerted by said third member against said bearing means on said first and second members exceeds the force exerted by said means urging said first and second members toward each other and said first and second members move relatively to each other to decrease the distance by which said bearing means on said first and second members are offset and to increase the distance by which said bearing means are separated, and means actuated by said relative movement of said first and second members for releasing said brake means and permitting said driving member to move said driven member.

7. A torque responsive coupling device comprising a driving member adapted to rotate and exert torque; a driven member adapted to be rotated by the driving member when the driving member exerts a torque exceeding a predetermined magnitude; releasable brake means for preventing rotation of the driven member until released; and means responsive to a torque exceeding a predetermined magnitude exerted by said driving member for releasing said brake means comprising a first rotatable member connected to said driving member and adapted to exert a torque proportional to that exerted by said driving member, a second rotatable member adjacent to and spaced from said first member, means coaxially rotatably supporting said first and second members to permit limited relative rotational and axial movement therebetween, a third member disposed between said first and second members and having at fixed locations thereon two separate bearing means which contact said first and second members, bearing means on said first member against which bears one of the bearing means of said third member at a location fixed relatively to said first member, bearing means on said second member against which bears the other bearing means of said third member at a location fixed relatively to said second member, said bearing means on said first and second members being offset by a predetermined distance in the direction of rotation and being separated by a predetermined distance in the direction of the axis of rotation when said first member exerts a torque below a predetermined magnitude, means yieldably exerting an axially directed force urging said first and second members toward each other against said third member, whereby when a torque exceeding the predetermined magnitude is exerted by said first member the force exerted by said third member against the bearing means on said first and second members exceeds the force exerted by said means urging said first and second members toward each other and said first and second members move rotationally and axially relative to each other to decrease the distance by which said bearing means on said first and second members are offset and to increase the distance by which said bearing means are separated, and means actuated by said relative movement of said first and second members for releasing said brake means and permitting said driving member to rotate said driven member.

8. The apparatus of claim 7 in which said means exerting a predetermined axially directed force urging said first and second members toward each other exerts a resilient force.

9. A torque responsive coupling device comprising a driving member adapted to rotate and exert a torque; a driven member adapted to be rotated by the driving member when the driving member exerts a torque exceeding a predetermined magnitude; releasable brake means for preventing rotation of the driven member until released; and means responsive to a torque exceeding a predetermined magnitude exerted by said driving member for releasing said brake means comprising a first rotatable member connected to said driving member and adapted to exert a torque proportional to that exerted by said driving member, a second rotatable member adjacent to and spaced from said first member, means coaxially rotatably supporting said first and second members to permit limited relative rotational axial movement therebetween, a plurality of movable torque responsive elements circumferentially spaced between said first and second members, each of said torque responsive elements having at fixed spaced locations thereon two separate bearing means each capable of providing substantially linear bearing contact with said first and second members, a plurality of bearing means circumferentially spaced at fixed locations on said first member each providing substantially linear bearing contact with one of the bearing means on one of said torque responsive elements, a plurality of bearing means circumferentially spaced at fixed locations on said second member each providing substantially linear bearing contact with another bearing means on one of said torque responsive elements, the related bearing means on said first and second members contacting a torque responsive element being offset by a predetermined distance in the direction of rotation and being separated by a predetermined distance in the direction of the axis of rotation when said first member exerts a torque below a predetermined magnitude, means yieldably exerting an axially directed force urging said first and second members toward each other against said torque responsive elements, whereby when a torque exceeding the predetermined magnitude is exerted by said first member the force exerted by each of said torque responsive elements against the associated bearing means on said first and second members exceeds the force exerted on said torque responsive element by said means urging said first and second members toward each other and said first and second members move rotationally and axially relatively to each other to decrease the distance by which said bearing means on said first and second members are offset and to increase the distance by which said bearing means are separated, and means actuated by said relative movement of said first and second members for releasing said brake means and permitting said driving member to rotate said driven member.

10. In an actuating device responsive to a force exceeding a predetermined magnitude, two adjacent members having a pair of facing recesses each of which has an essentially flat bottom and two essentially flat parallel end walls each forming a corner with the bottom of the recess, the bottoms of said recesses being essentially identical in length and essentially parallel to each other and being so located that they form a related pair in which they face and at least partially overlap each other; means supporting said members so they can move relatively to each other in a direction generally normal to the bottoms of the recesses and in a direction generally perpendicular to the end walls of the recesses from a position of maximum overlap of said recesses to a position of minimum overlap of said recesses; biasing means yieldably exerting a force urging said members toward each other; a tiltable element having essentially flat essentially parallel ends disposed in said pair of recesses with said ends normally bearing against the bottoms of said recesses, each of said ends being bounded by essentially parallel edges closely fitting against the corners of the recesses in which said end is disposed, said ends of said element being spaced apart by a distance greater than the total of the depths of said recesses and said element having sides shaped to clear said recesses when said element is in a tilted position, said dimensions of said element and said recesses and the force exerted by said biasing means being such that they predetermine a force magnitude whereby when said members are disposed with their paired recesses in the position of maximum overlap and said element is disposed therein with its ends bearing against the bottoms of said recesses, a force exceeding such predetermined magnitude exerted by one of said members in a direction generally perpendicular to the ends of said recesses will cause said element to tilt in said recesses, said members to move in a direction generally perpendicular to the ends of said recesses, and said members to move away from each other by a force exerted by said element on said members that exceeds the force exerted by said biasing means.

11. In an actuating device responsive to a force exceeding a predetermined magnitude, two adjacent members having a pair of facing recesses each of which has a flat bottom and two essentially flat, essentially parallel end walls each forming a corner with the bottom of the recess, the bottoms of said recesses being essentially identical in length, essentially parallel to each other, and normally located essentially directly opposite each other; means supporting said members so they can move relatively to each other in directions generally perpendicular to the end walls of the recesses and generally normal to the bottoms of the recesses; biasing means yieldably exerting a force urging said members toward each other; a tiltable element having essentially flat, essentially oppositely disposed and parallel ends disposed in said pair of recesses with said ends normally bearing against the bottoms of said recesses, each of said ends being bounded by essentially parallel edges closely fitting against the corners of the recess in which said end is disposed, said ends of said element being spaced apart by a distance greater than the total of the depths of said recesses and said element having inwardly recessed sides adapted to clear said recesses when said element is in a tilted position, said dimensions of said element and said recesses and the force exerted by said biasing means being such that they predetermine a force magnitude whereby when said members are disposed with their paired recesses directly opposite each other and said element is disposed therein with its ends bearing against the bottoms of said recesses, a force exceeding such predetermined magnitude exerted by one of said members in a direction generally perpendicular to the ends of said recesses will cause said element to tilt in said recesses, said members to move in a direction generally perpendicular to the ends of said recesses, and said members to move away from each other by a force exerted by said element on said members that exceeds the force exerted by said biasing means.

References Cited in the file of this patent
UNITED STATES PATENTS

| | | |
|---|---|---|
| 2,566,705 | Mergen et al. | Sept. 4, 1951 |
| 2,659,466 | Ochtman | Nov. 17, 1953 |